United States Patent
Drevinskas et al.

(10) Patent No.: US 11,802,993 B2
(45) Date of Patent: Oct. 31, 2023

(54) NANOSTRUCTURED OPTICAL ELEMENT, METHOD FOR FABRICATION AND USES THEREOF

(71) Applicant: University of Southampton, Southampton (GB)

(72) Inventors: Rokas Drevinskas, Southampton (GB); Peter Kazansky, Southampton (GB); Ausra Cerkauskaite, Southampton (GB)

(73) Assignee: University of Southampton, Southampton (GB)

( * ) Notice: Subject to any disclaimer, the term of this patent is extended or adjusted under 35 U.S.C. 154(b) by 532 days.

(21) Appl. No.: 16/970,242

(22) PCT Filed: Feb. 13, 2019

(86) PCT No.: PCT/GB2019/050375
§ 371 (c)(1),
(2) Date: Aug. 14, 2020

(87) PCT Pub. No.: WO2019/158910
PCT Pub. Date: Aug. 22, 2019

(65) Prior Publication Data
US 2020/0408953 A1     Dec. 31, 2020

(30) Foreign Application Priority Data

Feb. 15, 2018   (GB) ..................... 1802497

(51) Int. Cl.
*G02B 1/00*     (2006.01)
*G02B 5/30*     (2006.01)
*G02B 27/28*    (2006.01)

(52) U.S. Cl.
CPC ........... *G02B 1/002* (2013.01); *G02B 5/3083* (2013.01); *G02B 27/286* (2013.01)

(58) Field of Classification Search
CPC ........ G02B 1/002; G02B 5/3083; G02B 5/30; G02B 5/3025; G02B 27/286; G02B 27/28;
(Continued)

(56) References Cited

U.S. PATENT DOCUMENTS

| | | |
|---|---|---|
| 2006/0219676 A1 | 10/2006 | Taylor et al. |
| 2016/0334758 A1 | 11/2016 | Shaltout et al. |
| 2017/0219739 A1* | 8/2017 | Lin .................. G02B 5/008 |

FOREIGN PATENT DOCUMENTS

| | | |
|---|---|---|
| GB | 2 490 502 A | 11/2012 |
| WO | 2015/150566 | 11/2012 |

OTHER PUBLICATIONS

Sudrie et al., "Writing of permanent birefringent microlayers in bulk fused silica with femtosecond laser pulses", Optics Communications 171 (1999) 279-284, Dec. 1, 1999 (Year: 1999).*

(Continued)

*Primary Examiner* — Derek S. Chapel
*Assistant Examiner* — Adam W Booher
(74) *Attorney, Agent, or Firm* — Renner, Otto, Boisselle, & Sklar

(57) ABSTRACT

An optical element for modifying an incident laser beam propagated through the optical element from an input face to an output face via a geometric phase birefringent effect, the optical element comprising: a substrate of a transparent amorphous material with an input face and an opposite output face; and a structural modification in a volume of the substrate between the input face and output face comprising a plurality of randomly positioned nanostructures; wherein each nanostructure has a oblate spheroidal shape with an elliptical cross section in a plane parallel to the input face, the elliptical cross-section having a minor axis substantially not larger than 30 nm and a major axis greater than the minor (Continued)

axis, and each nanostructure having a length in a direction perpendicular to the input face which is substantially not larger than 100 nm.

21 Claims, 8 Drawing Sheets

(58) Field of Classification Search
CPC .. G02B 2207/101; G11B 7/00; G11B 7/0065; G11B 7/24; G11B 7/24044; G11B 7/26; G11B 7/006; G11B 7/0045; G11B 7/00454; B82Y 10/00; B82Y 20/00; G03H 1/0248; G03F 7/00; G03F 7/001; G03F 7/2053; C03C 23/0025
See application file for complete search history.

(56) References Cited

OTHER PUBLICATIONS

Ams et al., "Investigation of ultrafast laser-photonic material interactions: challenges for directly written glass photonics", arXiv:0802.1966 [physics optics], Feb. 14, 2008 (Year: 2008).*
Stankevic et al., "Laser printed nano-gratings: orientation and period peculiarities", Scientific Reports, 7:39989, Jan. 9, 2017 (Year: 2017).*
International Search Report and Written Opinion for corresponding International Patent Application No. PCT/GB2019/050375 dated May 17, 2019.
Liao Yang et al: Formation of nanogratings in a porous glass immersed in water by femtosecond laser irradiation, Visual Communications and Image Processing; Jan. 20, 2004; San Jose, vol. 9350, Mar. 4, 2015 (Mar. 4, 2015), pp. 93500G-93500G, XP060046295, DOI: 10.1117/12.2076905, ISBN: 978-1-62841-730-2, pp. 1,3, 6 and 7, figures 1-6.
Glezer En et al: "Three-dimensional optical storage inside transparent materials", Optics Letters, Optical Society of America, US, vol. 21, No. 24, Dec. 15, 1996 (Dec. 15, 1996), pp. 2023-2025, XP007906111, ISSN: 0146-9592, DOI: 10.1364/OL.21.002023 pp. 1-3; figures 1-4.
PG Kazansky, H Inouye, T Mitsuyu, K Miura, J Qiu, K Hirao and F Starrost, Phys. Rev. Lett. vol. 82, 2199-2102 (1999).
N Yu and F Capasso, Nat. Materials vol. 13, 139 (2014).
Y Shimotsuma, P Kazansky, J Qui and K Hirao, Phys Rev. Lett. vol. 91, 247405 (2003).
M Beresna, M Gecevicius, M Lancry, B Poumellec and PG Kazansky, Appl. Phys. Lett, vol. 103, 131903 (2013).
C Hnatovskya, RS Taylor, PP Rajeev, E Simova, VR Bhardwaj, DM Rayner and PB Corkum, Appl. Phys. Lett, vol. 87, 014104 (2005).
R Drevinskas and PG Kazansky, APL Photonics vol. 2, 066104 (2017).
A Rudenko, J-P Colombier, S Höhm, A Rosenfeld, J Krüger, J Bonse and TE Itina, Scientific Reports vol. 7 12306 (2017).
A Rudenko, H Ma, VP Veiko, J-P Colombier and TE Itina, Appl. Phys. A vol. 124, 63 (2018).
Amin Abdolvand, "Modification of optical and structural properties of glass containing silver nanoparticles via DC electric field and moderately elevated temperatures", Dec. 1, 2006, Dissertation, University and state library of Saxony-Anhalt (ULB).
Hofmeister, H. et al.; "Orientated prolate silver particles in glass—characteristics of novel dichroic polarizers", Nanostructured Materials, vol. 12, 1999, USA, 207-210.
Zheludev N, "Single nanoparticle as photonic switch and optical memory element", Journal of Optics A, Pure and Applied Optics, vol. 8, Jan. 4, 2006, Bristol, S1-S8.
Signoretto M. et al., "Polymer waveguide couplers based on metal nanoparticle-polymer nanocomposites", Nanotechnology, vol. 26, Mar. 11, 2015, Bristol, 475201 (10 pages).
Socoliuc V, "The influence of the Neel rotation on the magnetic induced dichroism in magnetic fluids", Journal of Magentism and Magnetic Materials 289, Jan. 3, 2005, 177-180.
United Kingdom Search Report for corresponding GB Patent Application No. 1802497.6 dated Aug. 15, 2018.

* cited by examiner

NANOSTRUCTURED OPTICAL ELEMENT, METHOD FOR FABRICATION AND USES THEREOF

BACKGROUND OF THE INVENTION

The present invention relates to nanostructured optical elements, methods for fabricating such elements, and uses of such elements.

Conventionally, an optical path difference arising from propagation of light through a material can be used to control the phase by controlling the local length and refractive index of the material through which the light propagates. However, despite many decades of expertise in the fabrication of optical elements such as gratings, lenses, and prisms based on this principle and formed using materials including glass, other silicon materials, metals and polymers, precision and quality still present challenges.

More recently, an alternative type of device has been developed, which uses the geometric phase to transform light using parameters other than optical path difference. The geometric phase, also known as the Panchatraman-Berry phase, is a phase difference acquired by a wave, such as a light wave, over the course of a cycle. It occurs when both polarisation and phase are changed simultaneously but very slowly, and eventually brought back to an initial configuration. In other words, the light undergoes a cyclic adiabatic process. To achieve the geometric phase, the light wave is modified by transmission through an element with a nanoscale spatially varying anisotropy, to produce a phase difference or phase shift. Formation of such anisotropic sub-wavelength structures was first reported in 1999 [1]. Also, the phase and/or polarisation of light have been manipulated using birefringent materials, which are optically anisotropic materials having a refractive index that depends on the polarisation and propagation direction of incident light. A desired phase profile can be encoded in the optical axis orientation of birefringent material by forming an appropriate spatially varying anisotropy. Theoretically, any phase pattern can be achieved using the geometric phase, with efficiencies up to 100% [2]. This allows continuous optical phase shifts to be achieved, without the need for any phase resets. This is in contrast to conventional optical elements, in which a phase profile is encoded as discrete optical path variations in the refractive index or thickness of the material, which places limitations on achievable performance.

Hence, optics based on the geometric phase are a promising alternative for light manipulation. Also, nanostructured materials patterned with the required anisotropy have other applications. Improvements in the design and fabrication of nanostructured optical elements are therefore of interest.

SUMMARY OF THE INVENTION

Aspects and embodiments are set out in the appended claims.

According to a first aspect of certain embodiments described herein, there is provided an optical element for modifying an incident laser beam propagated through the optical element from an input face to an output face via a geometric phase birefringent effect, the optical element comprising: a substrate of a transparent material with an input face and an opposite output face; and a structural modification in a volume of the substrate between the input face and output face comprising a plurality of randomly positioned nanostructures; wherein each nanostructure has a oblate spheroidal shape with an elliptical cross section in a plane parallel to the input face, the elliptical cross-section having a minor axis substantially not larger than 30 nm and a major axis greater than the minor axis, and each nanostructure having a length in a direction perpendicular to the input face which is substantially not larger than 100 nm.

According to a second aspect of certain embodiments described herein, there is provided a method of fabricating a nanostructured optical element, comprising: providing a substrate of a transparent material within which nanostructures are required and having a face intended for the input or output of light to be modified by the optical element; directing a focused beam of linearly polarised femtosecond pulses of laser light onto the substrate face to position the focus within the substrate; and causing relative movement between the beam and the substrate to scan the beam along a path over an area of the face where the nanostructures are required; wherein the beam is scanned to deliver pulses at a pulse density of not more than 100 pulses per micometre along the path; the pulses have a duration in the range of 100 to 1000 femtoseconds; and the beam is focused with a focusing arrangement having a numerical aperture in the range of 0.05 to 0.40.

According to a third aspect of certain embodiments described herein, there is provided a method of modifying one or more of a phase, polarisation or intensity of a light beam comprising passing the light beam through an optical element according to the first aspect from the input face to the output face.

According to a fourth aspect of certain embodiments described herein, there is provided a nanostructured optical element fabricated using a method according to the second aspect.

According to a fifth aspect of certain embodiments described herein, there is provided a multidimensional optical data storage element comprising: a substrate of a transparent material with an input face and an opposite output face; and a structural modification in a volume of the substrate between the input face and output face comprising a plurality of non-periodically positioned nanostructures in one or more layers; wherein each nanostructure has a oblate spheroidal shape with an elliptical cross section in a plane parallel to the input face, the elliptical cross-section having a minor axis substantially not larger than 30 nm and a major axis greater than the minor axis, and each nanostructure having a length in a direction perpendicular to the input face which is substantially not larger than 100 nm; and each nanostructure has one or more of a position within the substrate, an orientation of the major axis, and a length that are selected to encode data that can be read by transmitting one or more beams of light through the substrate from the input face to the output face and deducing birefringence of the substrate from the transmitted light.

According to a sixth aspect of certain embodiments described herein, there is provided a method of storing data in a multi-dimensional optical memory comprising: providing a substrate of a transparent amorphous material having an input face; directing a focused beam of linearly polarised femtosecond pulses of laser light onto the input face to position the focus within the substrate; and causing relative movement between the beam and the substrate to scan the beam along a path over an area of the face; wherein the beam is scanned to deliver pulses at a pulse density of not more than 100 pulses per micometre along the path; the pulses have a duration in the range of 100 to 1000 femtoseconds; and the beam is focused with a focusing arrangement having a numerical aperture in the range of 0.05 to 0.40; so as to create non-periodically positioned nanostructures in one or more layers within the substrate; wherein one or more of a polarised direction of the laser light, the pulse density, the numerical aperture, the pulse duration, a pulse energy and a wavelength of the laser light are varied during the scan to create nanostructures of varying size and/or orientation at different position within the substrate, the size and/or orientation and/or position within the substrate being selected to encode the data to be stored.

According to a seventh aspect of certain embodiments described herein, there is provided a multi-dimensional optical memory comprising encoded data stored using a method according the sixth aspect.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, nanostructured optical elements and methods for fabricating such elements may be provided in accordance with approaches described herein which includes any one or more of the various features described below as appropriate.

BRIEF DESCRIPTION OF THE DRAWINGS

For a better understanding of the invention and to show how the same may be carried into effect reference is now made by way of example to the accompanying drawings in which:

FIG. 9($b$) shows intensity profiles of radially polarised beams generated by transmission through the type X S-waveplate of FIG. 9($a$);

DETAILED DESCRIPTION

Figure 1:
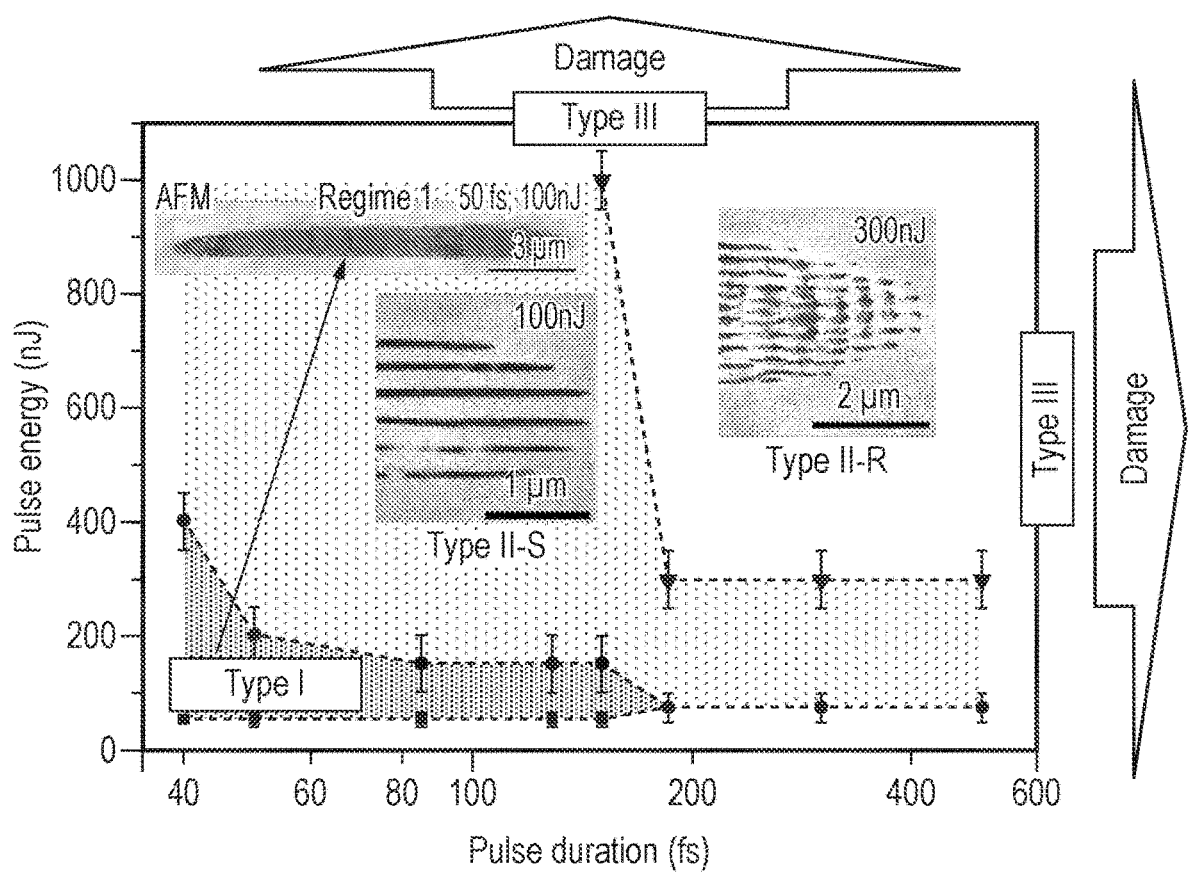
FIG. 1 shows a map of nanostructural modification type dependence on the energy and pulse duration of a writing light beam.

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

Embodiments of the present disclosure relate to nanostructured optical elements, for example elements that use the geometric phase effect to modify the polarisation and/or phase of light, methods for fabricating and using nanostructured optical elements, and applications of nanostructured optical elements. In the present disclosure, the term "optical element" refers to a substrate of appropriate material patterned with a nanostructure as described for optical use, regardless of the nature of the intended application, use or purpose of the nanostructured material. Such applications may or may not make use of the geometric phase.

Optical devices based on space-variant polarisation manipulation, in other words, suitable for operating in the geometric phase, can be fabricated from inherently anisotropic materials or in which an anisotropy can be induced. An example is liquid crystal materials, which, while versatile and flexible and hence a popular choice used for a number of commercially available products, have shortcomings including low durability, low thermal stability, and high absorption at infrared and ultraviolet wavelengths.

Alternative approaches utilise photolithographically-produced sub-wavelength gratings, and segmented linear polarisers, polymer or quartz-based waveplates. However, a small number and relative large size of the segments limits this approach to basic configurations only, limiting the complexity and uniformity of polarisation/phase/intensity optical profiles that can be generated using such elements. Manufacturing requires costly high precision and time-consuming assembly procedures.

A further alternative that offers better durability and uniformity is a nanostructure or nanograting induced in a suitable material such as glass using an incident ultrashort (ultrafast) pulsed laser beam. An example of a geometrical phase element of this type is a radial/azimuthal polarisation converter or "S-waveplate", described in WO 2015/150566 [3], which is able to transform incident linearly or circularly polarised light into radially/azimuthally polarised light or an optical vortex respectively. The element comprises a periodic, self-assembled nanograting in an optically transparent material, such as silica. The nanograting is a collection of nanometre-scale structural modifications or changes in a bulk material.

The laser-induced writing process for creating the nanostructures comprises scanning or writing an ultrashort pulsed laser beam over the material intended for the element, and is performed to deliver sufficient energy to cause a nanostructure becomes self-organised and periodic. However, there is a lack of control over the self-organisation that leads to uneven nanogratings and nano-cracks. This can give excessive scattering losses in the optical elements. For example, losses may be higher than 30% and about 75% scattering of incident light at 532 nm and 245 nm respectively. Lower losses may be achieved by delivering a higher density of incident pulses per mm of scan path, which allows the formation of more regular nanogratings. Transmission levels of 90% at 532 nm and more than 95% at 1 µm and above may be achieved, for example, using pulse densities in excess of $10^5$ per mm, and reducing the pulse energy. However, these losses are still significantly higher than for conventional optical elements formed in glass, or for geometrical phase optical elements formed in liquid crystals. High loss optical performance is undesirable in many applications, including optical imaging, high power laser machining and optical data storage.

In an early example of nanogratings [4], the formation of self-organised sub-wavelength periodic structures with feature sizes as small as 20 nm in bulk $SiO_2$ (silicon dioxide or silica) glass after irradiation with ultrashort light pulses from a Ti:sapphire laser was observed. Other examples of femtosecond laser induced nanogratings in silica have also been reported [5]. Latterly, the phenomenon has been generalised to recognise three different types of structural modification that can be induced by ultrafast laser irradiation of bulk optically transparent material, in particular silica glass. The type of structure is dependent in part on the parameters of the incident laser pulses. The structural modification is a change in the material that alters the refractive index of the material. Hence the optical properties of materials can be engineered by writing nanostructures into the material.

FIG. 1 shows a plot of the relationship between laser pulse duration and pulse energy and the resulting structural change induced in a bulk transparent material, in this case fused silica. The pulsed laser beam is moved or scanned along a path over the surface of a sample or blank of the material (a substrate) to induce the structural change in the volume of the material behind the area covered by the scan path, at a rate that can be referred to a writing speed or scan speed. For a given pulse repetition rate, the speed of the writing determines the number of pulses delivered to any part of the material, referred to as the pulse density, in units of number of pulses per distance of path length. The total amount of energy delivered to the material then depends on the energy per pulse. A faster writing speed gives a lower pulse density and lower total energy for a given pulse energy, and a slower writing speed gives a higher pulse density and higher total energy for a given pulse energy. The data in FIG. 1 is obtained for a constant writing speed that is considered to be slow writing, delivering a pulse density of more than $10^6$ pulses per millimetre of path length (pulse/mm). The laser emits femtosecond pulses, that is, pulses of duration up to about 1000 fs. Hence the structural modification induced by the energy of the incident laser pulses can be termed "femtosecond laser damage modification" (FLDM).

The type of structural modification, and the threshold of laser beam energy required to produce it, depends on factors including the laser parameters (pulse duration, pulse energy, pulse repetition rate, and wavelength), the numerical aperture of a lens or other focusing arrangement used to focus the beam onto surface of the material substrate, and the properties of the material itself (including band gap and thermal properties).

Three types of modification have been defined and are shown in FIG. 1: types I, II and III. These are described further below. In fused silica, the transition from type I to type II to type III is observed with an increase of pulse energy. Alternatively, type I may evolve into type II with an increased pulse duration or pulse density, if other parameters are constant. Hence, the total energy delivered by the pulses is relevant.

FIG. 1 shows that for shorter pulses and lower pulse energies, a type I modification is obtained, which is an isotropic, or smooth, refractive index change or modification. This is shown in the inset picture in FIG. 1 corresponding to the type I area, achieved using pulse energies between 50 and 100 nJ. At higher pulse energies and longer pulses, a type II modification is obtained, which is a form birefringence associated with self-assembled nanogratings and a negative refractive index change. Type II modifications can be divided into two sub-types. Within the type II regime, lower energies and shorter pulses produce a type II-S (smooth) modification comprising nanogratings embedded in a smooth index modification. The type II-S area in FIG. 1 includes an inset picture of such a structure produced from 100 nJ pulses. Higher pulse energies and longer pulses produce a type II-R (rough) modification comprising a complex morphology of disrupted regions, nanogratings and smooth modification. The type II-R are in FIG. 1 includes an inset picture of such a structure produced from 300 nJ pulses.

In addition to type I and type II modifications, further increases in pulse energy and duration produce a void or damage in the material; this is designated as a type III modification.

The formation of the various structural modification types is a competitive process, with a particular type dominating according to the processing conditions. Under certain processing conditions, type I can dominate over type II and III, or vice versa. Using short laser pulses, there is not enough energy deposited to the lattice of the bulk material to induce nanogratings or voids. Instead, random defects or nanostructures and local densification can be initiated which causes the positive index change. Alternatively, using extreme conditions such as high laser pulse repetition rates (typically in excess of 10 MHz), the laser pulses can provide sufficient accumulated heat and lattice thermalisation to induce permanent material modification. However, due to high fictive temperatures the structure has enough time to relax (erase) before the re-solidification takes place, resulting in densification and positive index change. Using low laser pulse repetition rates, longer laser pulses, high numerical aperture, or high pulse density, the threshold of energy from the laser pulses required for a type I modification overlaps with the energy threshold of type II or type III. In this case, the type II or III will dominate and the modification starts with the formation of nanogratings or damage, and local temperature is low enough that the re-solidification takes place before the structure relaxes. Using very high energies, under any circumstances, the damage of type III is produced.

In summary, the formation of three types of structural modification has been understood to date, namely a type I structure with no optical anisotropy, a type II structure of nanogratings providing an anisotropic refractive index pattern and hence birefringence, where there is a strong dependence of the anisotropy on the polarisation of the writing beam, and a type III structure comprising damage with no polarisation-dependent anisotropy.

A type II modification or structure behaves as a uniaxial birefringent material with an optical axis parallel to the direction of polarisation of the writing laser beam. The birefringence of the nanogratings is negative (for example, around $-5\times10^{-3}$ in silica). This is typical for lamellar-like form birefringence, and is of the same order of magnitude as the birefringence of quartz crystal ($9\times10^{-3}$). Consequently, these nanostructures are highly suitable for implementing geometric phase optics, as an alternative to conventional birefringent materials for phase manipulation of light. For example, the S-waveplate noted above uses a type II structure. To achieve a shorter fabrication time, waveplates may be formed in the type II-R regime. For improved optical quality (including lower loss), a type II-S structure can be made using a higher pulse density and lower pulse energy, but this results in a slower fabrication time. Examples of type II structures for lower loss optical geometric phase elements have been reported [7].

Type II nanogratings are self-assembled, meaning that individual nanostructures making up the nanograting are arranged in a substantially regular and periodic placement or array. The self-assembly evolves with the number of pulses (pulse density) delivered to the irradiated region of the bulk material. The first pulses typically create randomly distributed nanostructures, with subsequent pulses enabling the modification to develop into a periodic lamellar-like nanograting. Note that in the present disclosure, the term "nanostructure" may refer to individual structures within a nanograting (the nanograting is a collection of nanostructures), or may refer to the overall structural modification making up a nanograting or other pattern of laser-induced structural modification (the nanograting is a nanostructure). "Structure" and "nanostructure" may be used interchangeably, expect if specifically indicated otherwise, or clear from the context. The term "nanostructure" indicates a structure with dimensions on the nanometre scale (i.e. 1000 nm or less, typically much less), which can also be considered as "sub-wavelength" structures in that the dimensions are smaller than the wavelength of light for which the optical element is designed.

Reducing the optical loss of these structures is of interest. As noted above, typically a high pulse density delivered at a slow writing speed has been used to reduce loss by improving the quality of a self-assembled nanostructure. Surprisingly, and contrary to current techniques, the present inventors have found that a reduction in pulse density, for example delivered by increasing the writing speed (and hence a reduction in the total energy delivered to the material), can still produce useful nanostructures, which show a significantly reduced loss compared to type II nanogratings. The increased writing speed is also beneficial because it allows nanostructured optical elements, for geometric phase use and other applications, to be produced more quickly, thereby reducing manufacturing time.

The technique, which can be referred to as "fast writing" if this is the approach used to reduce the pulse density and energy delivered, delivers to the bulk material a density of femtosecond pulses that in many cases is lower than $10^5$ pulses/mm (100 pulses/μm). The resulting structural modification or nanostructure will be referred to herein as type X to distinguish it from the types I, II and III already described. The type X nanostructures show a relatively low birefringence, around four times less than the birefringence of type II nanograting. Conventionally, a birefringence of this size would be dismissed as impractical for a useful geometric phase device. However, it has been found that by shaping the fast writing laser beam with a low numerical aperture lens for a correspondingly long Rayleigh length, the nanostructures can be written with a relatively long length in the intended optical propagation direction through the optical element. Lengths of the order of 50 μm or more, for example up to about 100 μm, can be written. This length of nanostructure, lying along the light propagation direction, compensates for the low birefringence, since the required parameter for birefringent operation is phase retardance, defined as the product of birefringence and optical path length.

A type X modification comprises randomly distributed individual nanostructures, as would be expected in the absence of the high pulse density employed to form self-assembled and regular type II structures. However, periodicity of the nanostructures is not required to provide the desired birefringence, which instead depends on the orientation of the individual structures within the bulk material. Hence, the absence of self-assembly is not a barrier to the production of high quality optical elements. Also, the type X anisotropy is dependent on the polarisation of the laser writing beam. Each nanostructure has an anisotropy defined by its shape, which is an oblate spheroid (ellipsoid) shape, or lenticular shape. As noted, they are randomly spaced apart within the substrate material, although lying generally within a layer at a constant depth behind the optical input surface of the optical element. More than one layer may be written depending on the intended use of the optical element. The oblate spheroid shape is oriented with the plane of its circular cross section parallel to the optical propagation direction through the optical element and perpendicular to the input surface of the optical element. The elliptical or oval cross-section which is parallel to the input surface can be oriented with its major axis at any angle, where the major axis is formed perpendicular to the polarisation of the writing light beam. The minor axis is parallel to the polarisation of the writing light beam. Since the overall shape is lenticular, the extent of the nanostructure in the optical propagation direction, namely the length along the direction through the thickness of the optical element from the input surface to the output surface, is the same as the major axis.

Type X can be thought of an intermediate type of structural modification, having a random distribution of nanostructures which nevertheless has a strong polarisation-dependent anisotropy. Visually, a type X structure has the appearance of a type I modification (with high transmission and therefore not readily apparent to visual inspection) combined with the behaviour of a type II modification (strong anisotropy).

Accordingly, the present disclosure presents a method for writing nanostructures that uses a low pulse density of femtosecond pulses from a writing laser to create randomly distributed oblate nanostructures in a bulk material to produce a low loss birefringent optical element. The approach is flexible and offers high resolution to produce birefringent optical elements with both a high thermal stability (limited by the bulk substrate material only), and low losses. Examples includes over 96% transmission at 532 nm and over 99% transmission at 1 μm and above, for anti-reflection coated material. An optical element nanostructured in this way has a wide range of applications.

Figure 2A:
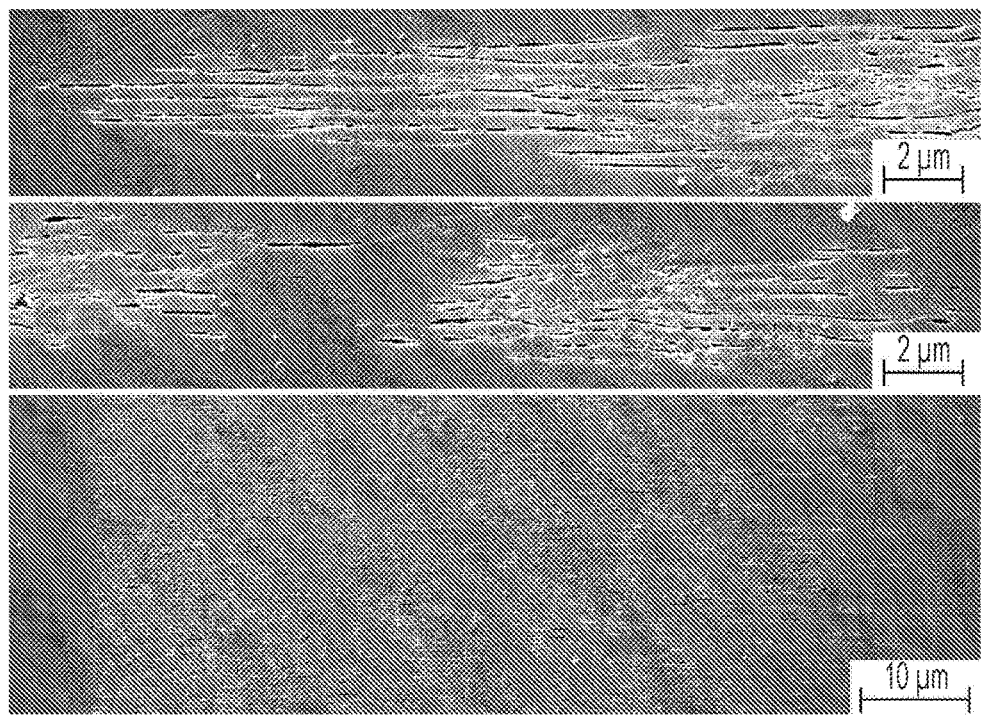
FIG. 2A shows scanning electron microscope images of a type II nanograting structural modification in silica.
Figure 2B:
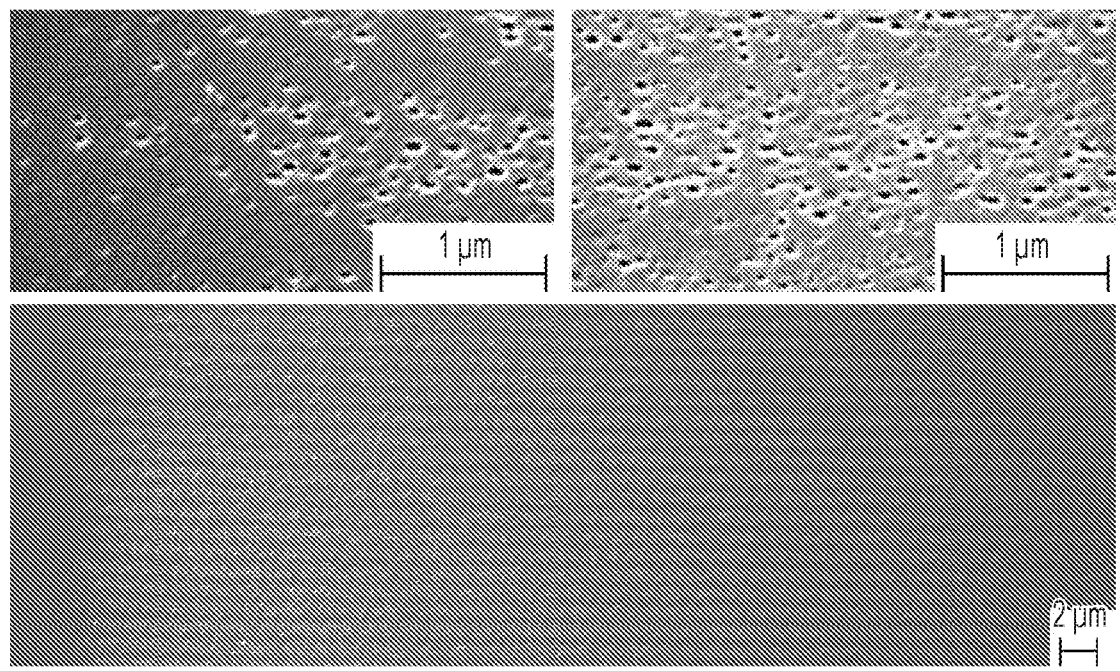
FIG. 2B shows scanning electron microscope images of a type X nanostructural modification in silica.
Figure 2C:
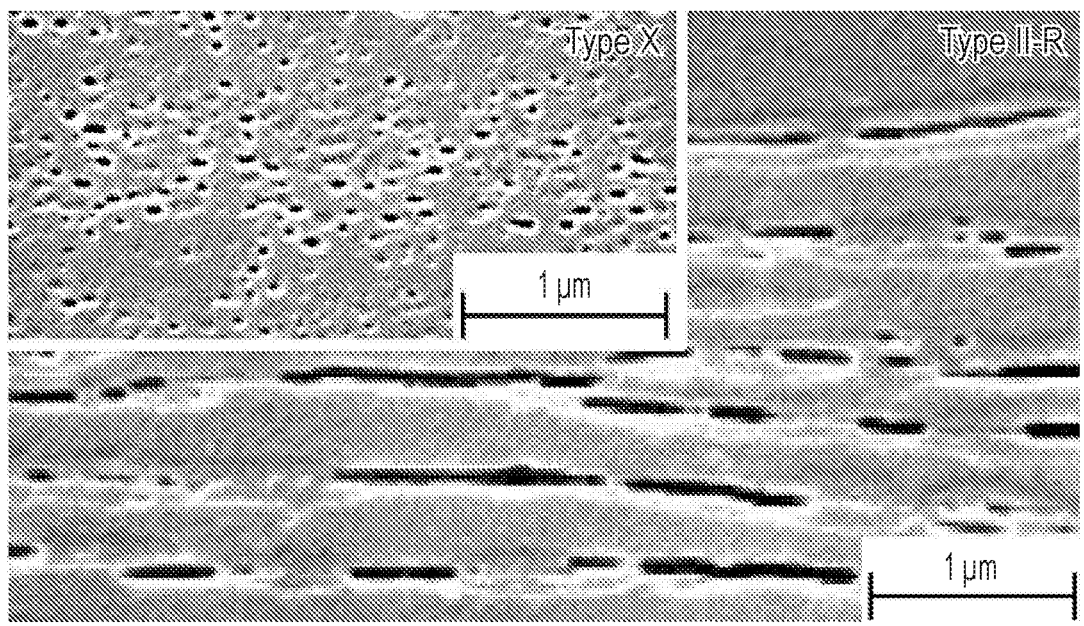
FIG. 2C shows scanning electron microscope images of a type X nanostructure and a type II nanograting.

FIGS. 2A, 2B and 2C show scanning electron microscope (SEM) images of examples of structural modifications written into bulk silica. FIG. 2A shows three images of cross-sections through silica (of which two are "close-up" images and one is a wider angle view, as indicated by the scales shown) having a type II-R modification in a S-waveplate written with a pulse density of $>10^5$ pulses/mm. The regular, periodic arrangement of the lamellar-like structures making up the nanograting is readily apparent. FIG. 2B, in contrast, shows three images (again at different scales, as indicated)

of cross-sections through an element into which a type X modification has been written using a pulse density of <10$^5$ pulses/mm. The random distribution of the nanostructures and the oval cross-sectional shape can be seen. For ease of comparison, FIG. 2C shows an image of a type X modification and an image of a type II-R modification at the same magnification, from which the very different shapes and arrangements of the two modification types can be readily appreciated.

Note that in the present disclosure, the term "random" is used to describe that the nanostructures in a type X modification are arranged without any discernible periodicity or pattern. The spacing between adjacent nanostructures is random, and the individual nanostructures are positioned at random as layer within the thickness of the bulk material.

As is evident from FIG. 2B, a low loss structure created by writing with a low pulse density comprises randomly distributed nanostructures. As noted above, it is important to appreciate that a periodicity of subwavelength structures within a bulk material is not necessary to produce birefringence. Rather, the birefringence is defined by the shape and orientation of the structures, which can be randomly distributed in the volume of material which has been irradiated by the writing light beam.

Figure 3:
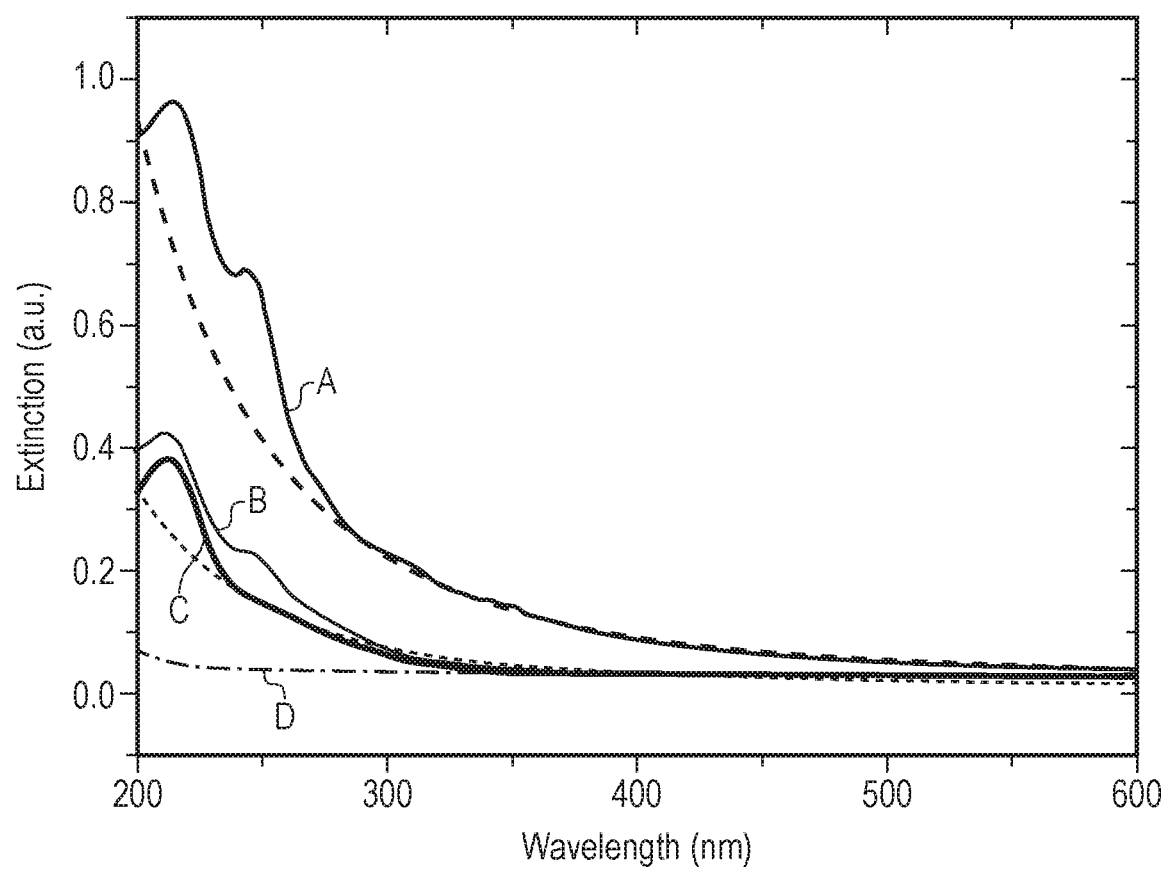
FIG. 3 shows a graph of optical transmission loss for several types of nanostructural modification in silica.

FIG. 3 shows transmission spectra as a graph of extinction against wavelength for the different structural types, to demonstrate the improved transmission (lower loss) of a type X modification. It can be seen that the loss in a type X structure (line B) is significantly reduced compared to a type II-R structure (line A), particularly at shorter wavelengths. The type X loss is comparable to the lower loss of a type I structure lacking any anisotropy (line C). For both type X and type II, the majority of the loss observed is due to Rayleigh scattering of the inhomogeneous structure, described by a $1/\lambda^4$ dependence, and shown in FIG. 3 as the adjacent dashed lines. The very low loss of unmodified bulk silica is also shown for comparison (line D). From this it is apparent that a type X modification has a much less significant impact on loss compared to unmodified silica than a type II modification.

As can be seen in FIG. 3, in addition to the Rayleigh scattering losses, there are two absorption bands that can be distinguished at short wavelengths. These are attributed to SiE' centres causing absorption at 210 nm (≡Si', an unpaired electron in a silicon atom bound to three oxygen atoms), and ODC(II) (oxygen deficiency centre) causing absorption at 245 nm (—O—Si—O—, a divalent silicon atom). For type X structures the absorption band attributed to ODC(II) is less significant that for type II structures, indicating a lower concentration of oxygen deficient defects in the type X regime. The type I structures with isotropic refractive index increase (type I) show only the absorption band related to the SiE' centre. It can be readily appreciated that overall losses of type X structures, arising from absorption and scattering, are significantly lower than for type II.

The development of the type X structure and the methods for writing it recognise that a periodic nanograting written with a short pulse laser beam evolves (self-organises) with the number of pulses (total energy) delivered to the material, and that in order to reduce or eliminate losses from Rayleigh scattering, smoother and/or smaller nanostructures are required, which need not be periodically arranged.

Under certain conditions of irradiation with femtosecond laser pulses, the excitation of randomly distributed nanometric inhomogeneities in suitable optically transparent material such as silica glass produces spherically shaped nanoplasma, which later develop into spherical nanopores and densifications generated due to local glass decomposition. With some irradiation (delivered at 100 pulses/μm and weak focusing (low numerical aperture lens), for example), the electric field is enhanced at the equator of the structures, and the structures start to grow producing random anisotropic nano-oblate structures oriented perpendicular to the laser polarization. If the conditions for type X are met, this anisotropic structure re-solidifies before it relaxes and the type X nanostructures are produced. If, instead, the pulse energy and pulse number is increased (delivered at >100 pulses/μm and weak focusing, for example), the density of the nanostructures increases, and the mutual enhancement induced by multiple scattering from structures becomes dominant. Then, the higher temperatures and reduced viscosity of the material cause the random structures to self-organize into a highly ordered nanograting, producing a type II structure. The more pulses which are delivered, the smoother is the nanograting that can be generated. However, if the pulse energy is too high, the formation of irregularities, nano-cracks and large size pores is initiated. As a result, functional elements made of structures of more than 30 nm in width are fabricated, and Rayleigh scattering becomes predominant, giving high losses. This process has been described elsewhere [8, 9] Accordingly, in order to reduce the losses, the early stage modification conditions should be used, when only the randomly distributed anisotropic structures of type X are formed. These oblate structures are less than 20 to 30 nm in width (smallest dimension of the structure), and oriented with this dimension parallel to the polarisation of the writing beam. In the direction perpendicular to the writing beam polarisation, the structures are elongated.

Figure 4:
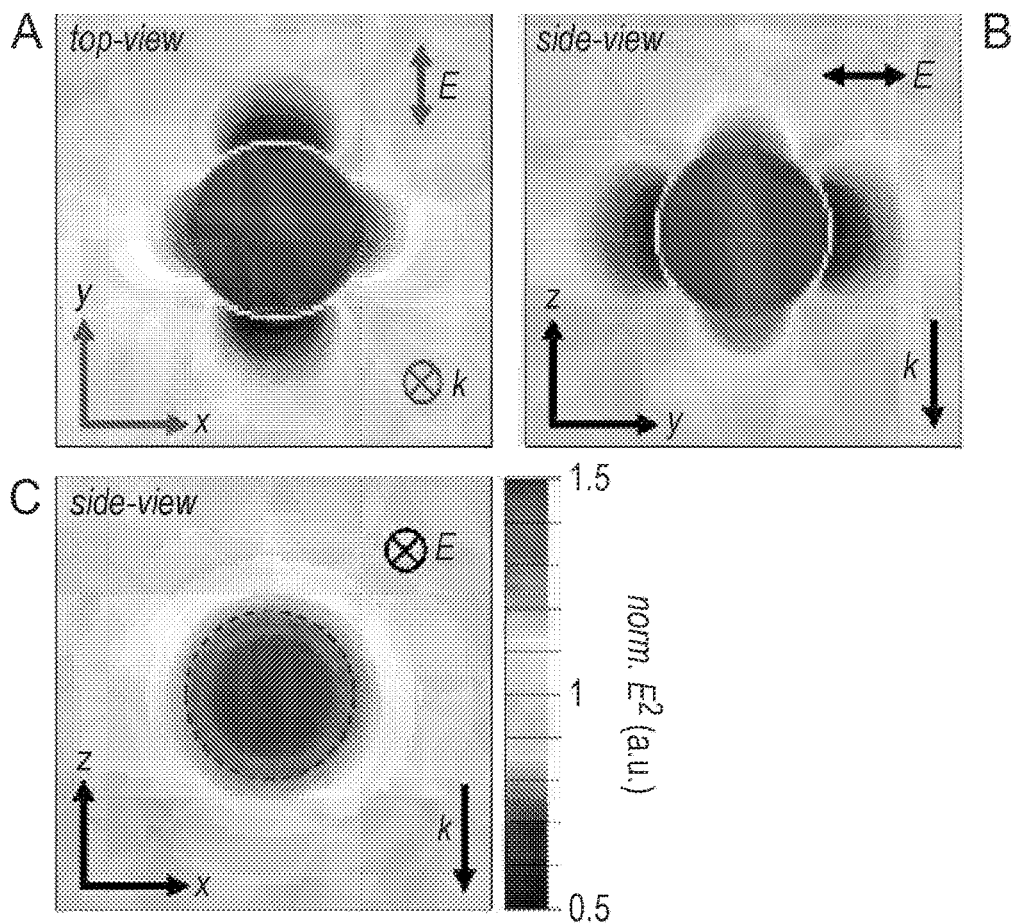
FIG. 4 shows simulated views of the distribution of an electric field of a writing light beam being used to write an oblate nanostructure with a 20 nm width.

FIG. 4 shows simulations of electric field propagation in a 20 nm cavity within silica, from three directions, to illustrate the formation of the nano-oblate structures of type X modification. FIG. 4A is a top view and FIGS. 4B and 4C are side views; the x, y and z axes are indicated together with the polarisation of the electric field E of the writing beam. The top view, in the x-y plane, is parallel to the input face of the material, with the z-axis being the propagation direction of the writing beam, which is polarised along the y-axis. The modelling demonstrates the enhancement of the electric field at the equators of the induced spherical nanopores. This distribution of the electrical field causes the resulting nanostructures to grow into oblate shapes with their longer dimension oriented perpendicular to the polarisation direction of the writing laser beam.

Figure 5:
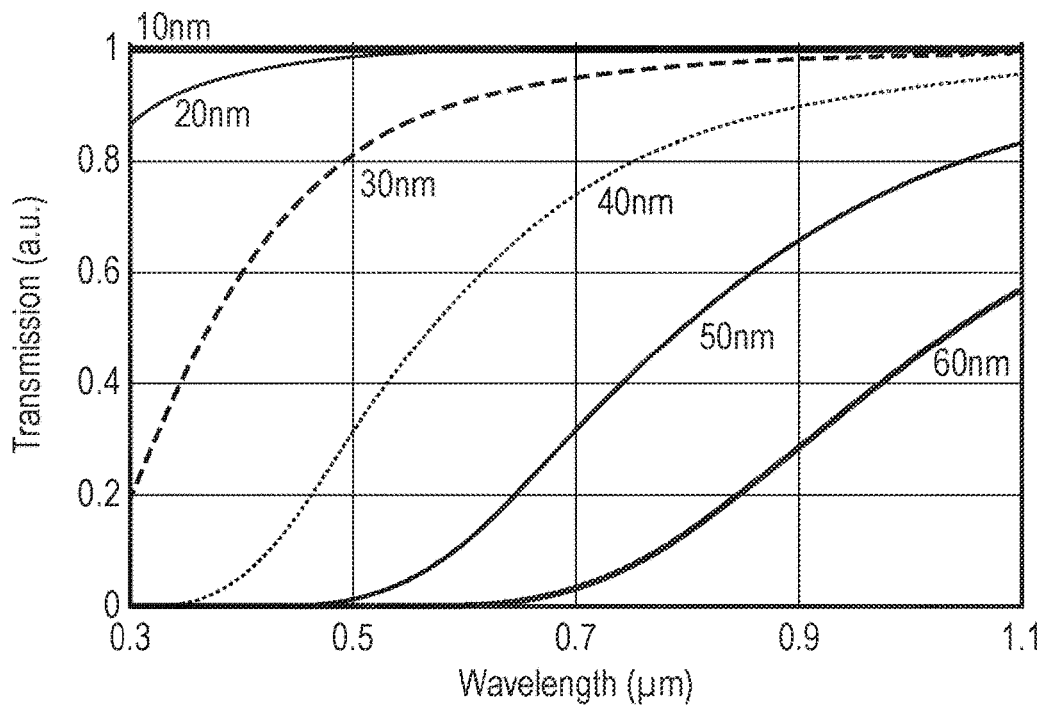
FIG. 5 shows a graph of modelled optical transmission for silica comprising nanoscale cavities of different sizes.

FIG. 5 shows a set of simulated transmission spectra as graphs of optical transmission against wavelength for a range of sizes of cavities (10 nm to 60 nm) within bulk silica. The transmission, which in this modelling is based on Rayleigh scattering with its $1/\lambda^4$ dependence, is much higher for smaller cavity sizes; conversely, loss is much greater for larger cavities. Accordingly, for a low loss geometric phase optical element, the nanostructures should be limited in size. This is achievable with a type X structure, which has oblate nanostructures with widths (smallest dimension) less than 20 to 30 nm. Note that the width of the nanostructure is a dimension perpendicular to the intended propagation direction of light through the optical element when it is used for phase modulation, other optical manipulation or other optical applications such as optical data storage. Also, it is a dimension parallel to the polarisation direction of the light beam used to write the nanostructure, and hence therefore also perpendicular to the propagation direction of the writing light beam.

For a given configuration of writing light beam apparatus for forming the type X structure in a bulk material sample, the ranges of pulse energy and pulse duration which should be used to write a type X nanostructure are relatively narrow. This suggests that the regime that results in the formation of a type X structure is defined by competing regimes that would otherwise produce a type I structure and a type II structure.

Figure 6:
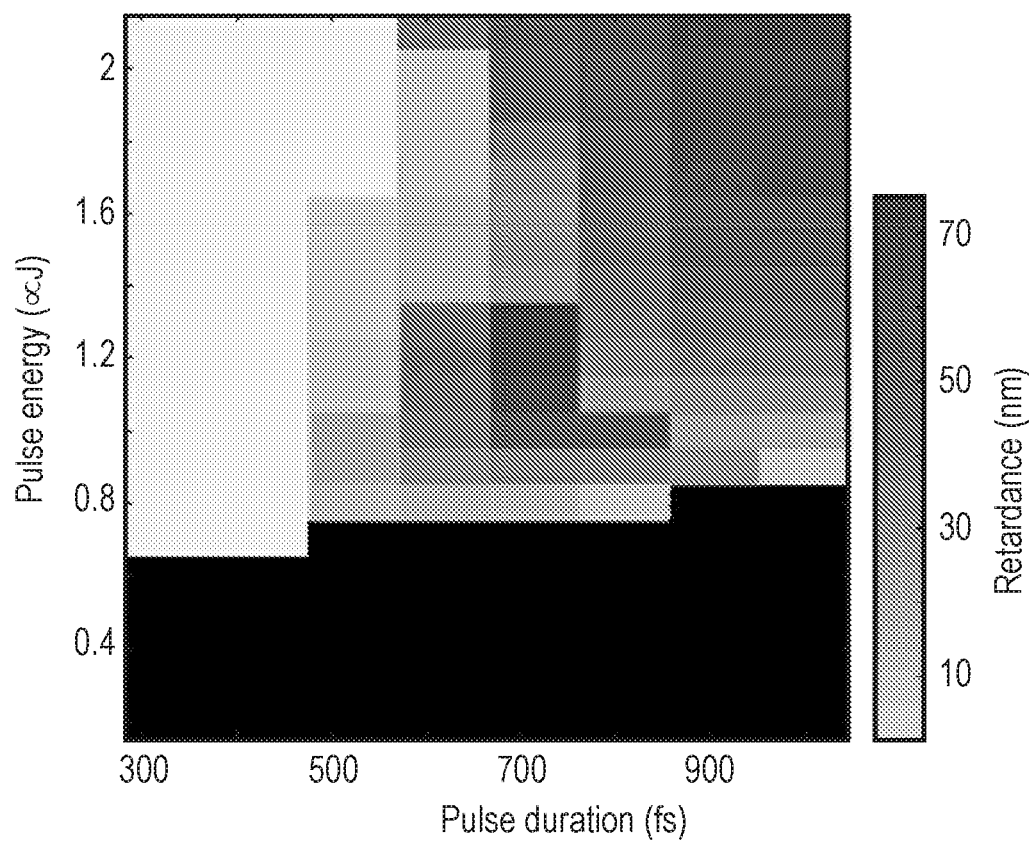
FIG. 6 shows a map of achievable geometric phase optical retardance from a type X nanostructural modification in silica and its dependence on pulse energy and pulse duration.

FIG. 6 shows a map of the variation of retardance (total birefringent effect) available from a type X structure according to the pulse energy and the pulse duration used to pattern the structure into silica. Pulse energies above about 0.8 µJ and longer than about 500 fs produce a retardance of a useful level (10 nm and above). However, pulse energies above about 1.5 µJ combined with pulses longer than about 900 fs can exceed the energy threshold for type X, and push the nanostructure into the type II regime. This data is for a pulse density of less than 100 pulses/µm, a pulse repetition rate of 200 kHz, a wavelength of 1030 nm and a numerical aperture of 0.16.

The map of FIG. 6 shows ranges of pulse energies and pulse durations for successful writing of a type X structure for other, constant, laser parameters. The higher pulse energies and longer pulse lengths increase the total amount of energy delivered to the substrate, and can enter the regime for type II fabrication. The total energy can be affected by adjustment of other parameters, also. For example, the numerical aperture of the focusing arrangement applied to the writing beam determines the focal spot size and hence the energy density. A low numerical aperture gives a large spot with lower energy density and a high numerical aperture gives a smaller spot with higher energy density. Thus, if other parameters remain constant, changing the numerical aperture will affect the total energy delivered to any part of the material, and may take the modification out of the type X regime and into the type II regime.

Figure 6A:
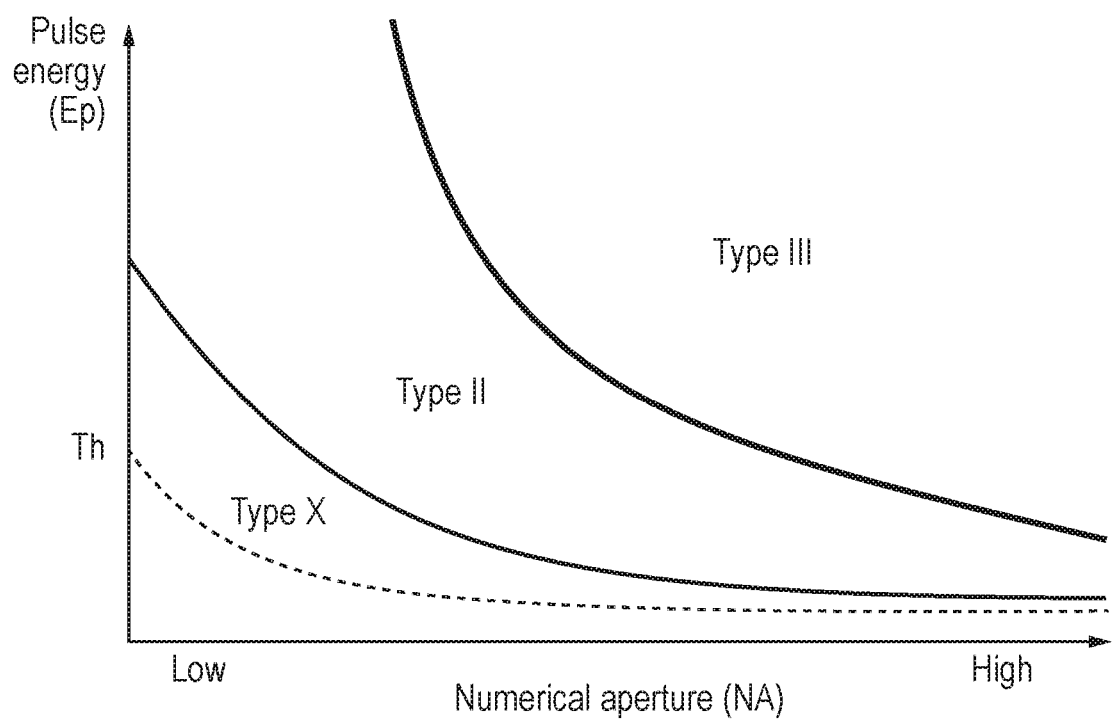
FIG. 6A shows a schematic graph indicating a dependence of nanostructural modification type on pulse energy and numerical aperture.

FIG. 6A shows a simple schematic plot of the relationship between pulse energy Ep and numerical aperture NA. For low pulse energies there will be a threshold Th below which no type X structure is formed regardless of the numerical aperture. Above the threshold, appropriate energies for type X can be delivered by suitable combinations of low pulse energy and high NA or high pulse energy with low NA. However, if both the pulse energy and the NA are increased too much, the total energy becomes too high and a type II structure is formed. Increasing these parameters still further will eventually lead to type III damage. At high NA, the range of pulse energies for which a type X structure can be achieved becomes very narrow, so it may be easier to work with lower numerical apertures.

Figure 7:
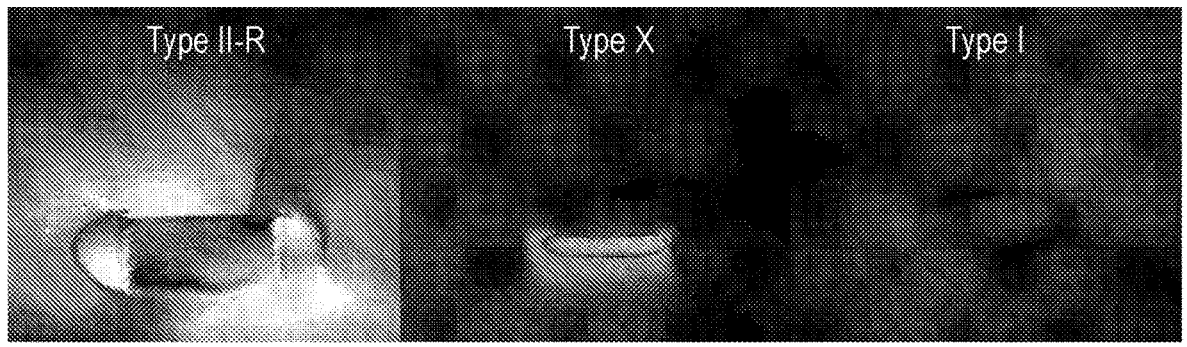
FIG. 7 shows images of stress induced in silica by different nanostructural modification types.

FIG. 7 shows birefringence images of silica modified with type II-R, type X and type I structures, demonstrating levels of stress induced in the bulk material by the laser writing process. Both the type II-R and the type I materials show radially distributed stress. This is particularly significant in the type II-R structure, and arises from the increase of volume of the modified material in the irradiated volume that gives rise to the negative change in refractive index. Conversely, stress in the type I structure arises from material compaction in the irradiated volume, producing the positive change in refractive index. In contrast, the type X structure shows no radial stress. This evidence also supports the view that the type X structure arises from a competitive process balanced between type I and type II modifications. The absence of stress in a type X structure is a beneficial characteristic, which has importance for applications such as optical data storage (described further below).

As described above, the orientation of the randomly distributed nano-oblate structures that make up a type X modification is perpendicular to the polarisation of the writing laser beam. In this context, "orientation" refers to the direction of the major, elongated, axis of the elliptical cross-section of the nanostructure in a plane parallel to the polarisation direction and perpendicular to the writing beam propagation direction. The orientation itself is perpendicular to the writing beam polarisation direction. The direction of this orientation is also the direction of the slow axis of the imprinted birefringence. Accordingly, the orientation of the nanostructures can be controlled and tailored by controlling the direction of the writing laser beam polarisation. Since the orientation of the nanostructures governs the axis of the birefringence offered via the geometric phase effect, this allows the spatial variation of birefringence of the structures to be patterned as required, thereby enabling the fabrication of a variety of optical elements for modifying or modulating the phase, polarisation and intensity of an incident light beam. The optical axis of the birefringence may also be used to encode data in optical storage, described further below.

In addition, the level of the retardance can be tailored, by adjusting the amount of energy delivered since this controls the overall size of the nanostructures. As discussed the energy can be controlled via many parameters, including the pulse density, pulse duration, individual pulse energy and numerical aperture.

Figure 8:
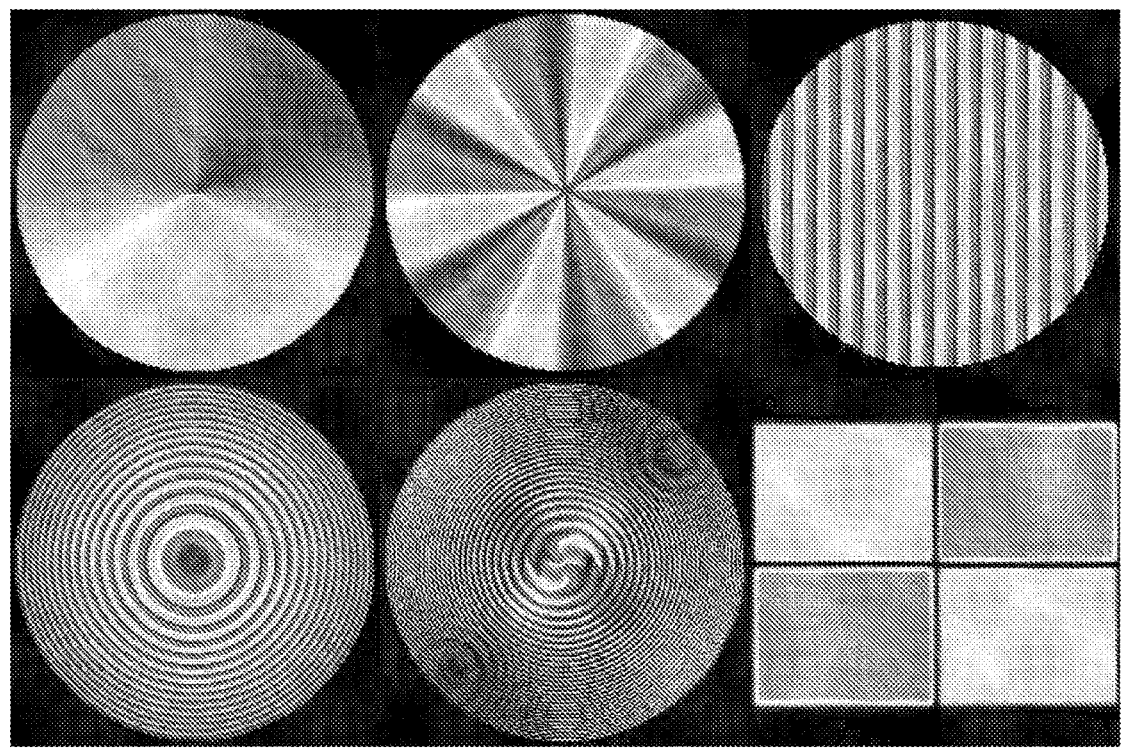
FIG. 8 shows images of birefringence from type X nanostructural modifications written into silica to provide a variety of polarisation-sensitive optical elements.

FIG. 8 shows images of a range of polarisation sensitive optical elements created using a type X modification in silica. The shadings indicate the local orientation of the slow axis of the birefringent structure imprinted by a method as described herein. The top row of images, from the top left, shows a radial/azimuthal polarisation converter, a polarisation converter of charge 6, and a polarisation grating. The bottom row of images, from the bottom left, shows a polarisation directed flat lens, a vortex phase lens, and an array of micro-waveplates. These images demonstrate both the flexibility of the technique in its ability to enable a wide range of optical elements, and the quality and uniformity of the structures produced.

S-waveplates, or radial/azimuthal polarisation converters, with the functionality of those described in WO 2012/150566 have been successfully fabricated based on a type X structure, and offer superior performance compared with similar devices based on other structural modifications.

Figure 9:
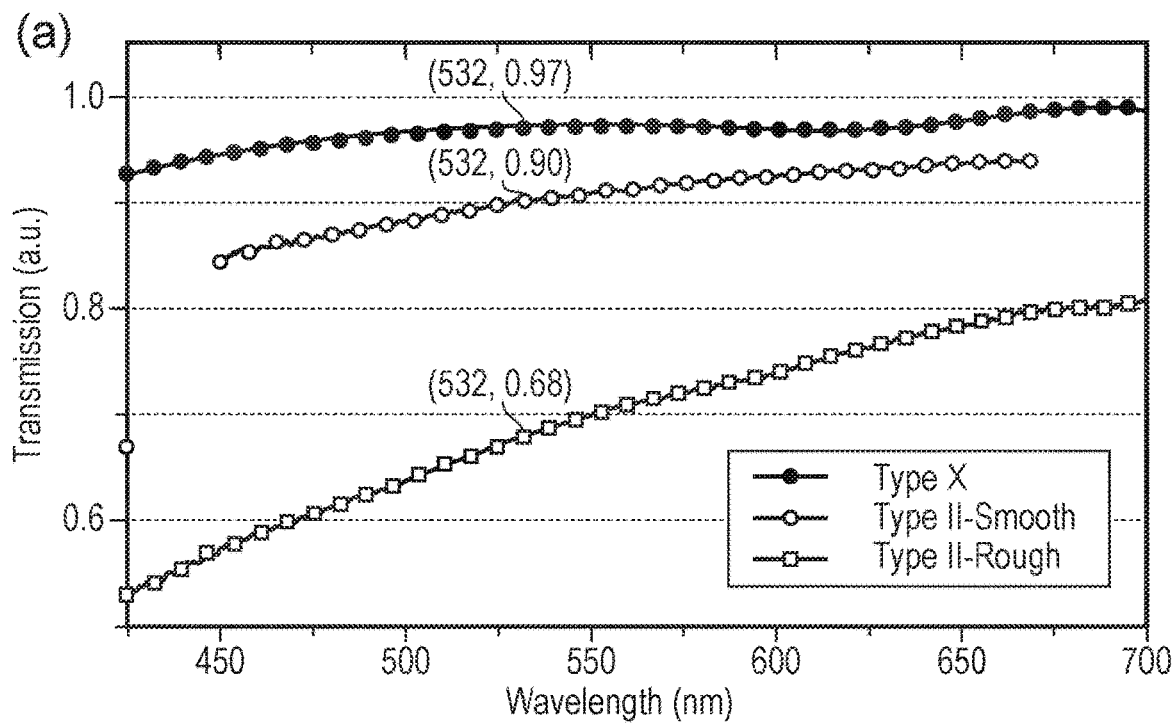
FIG. 9($a$) shows a graph of optical transmission for S-waveplates created in silica using type II and type X nanostructural modifications.
Figure 9:
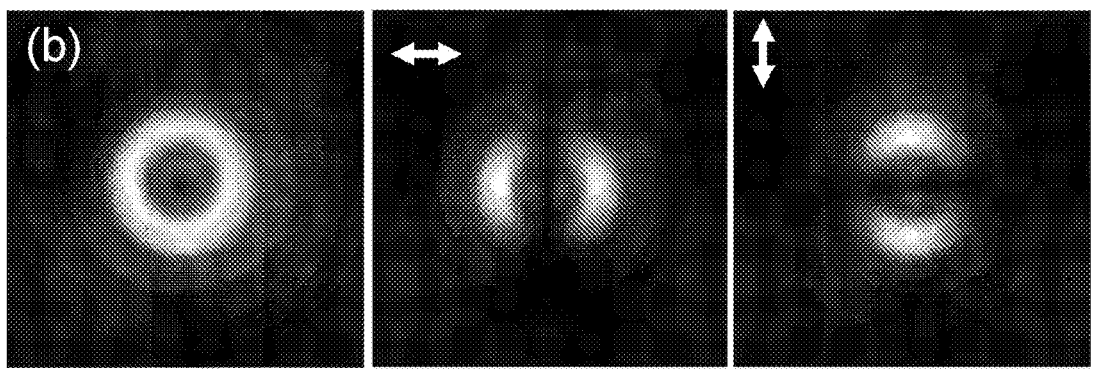

FIG. 9A shows transmission spectra, as a graph of transmission against wavelength, for three S-waveplates tuned for operation at 532 nm and fabricated with type X, type II-S and type II-R modifications. As can be seen, the type X device offers a lower optical loss (higher transmission) than both the type II devices for all wavelengths from 425 to 700 nm. Transmission in excess of 90% is provided at all wavelengths, and in excess of 95% for wavelengths above about 470 nm. In particular, transmission has been measured as at least 85% at 343 nm, at least 95% at 515 nm and at about 99% at 1030 nm.

FIG. 9B shows images of intensity profiles of an output beam which has been radially polarised using a type X S-waveplate tuned for 343 nm. As can be seen, intensity patterns are highly symmetrical with the required doughnut shape. This excellent beam shape is attributable to the high uniformity of the type-X modification in the waveplate.

Accordingly, an optical element written with a type X nanostructural modification as described herein by a method as described herein comprises a randomly distributed multiplicity of nanostructures formed within a volume of a bulk material, wherein the individual nanostructures have an oblate shape with an elliptical cross section in a plane parallel to an intended optical input face of the element. The optical input face is a surface of the optical element which, during use of the element, receives an incident light beam which it is intended will have its phase and/or polarisation and/or intensity profile and/or some other property modified or modulated by propagation through the optical element from the input face to an opposite output face. The light beam experiences the birefringence of the optical element during its propagation through the optical element, to acquire the modification. The birefringence is an effect of the presence of the nanostructures and their anisotropic shape in the plane parallel to the input face.

The nanostructures have a dimension along a minor axis of the elliptical cross-section parallel to the input face which in some embodiments is 30 nm or less, and in some embodiments is 20 nm or less. This dimension is the smallest dimension in this plane (also the smallest dimension of the oblate structure overall), and is designated as the width of the nanostructure. In other examples, the nanostructures may have a width of not exceeding 25 nm, or not exceeding 15 nm, or not exceeding 10 nm or not exceeding 5 nm, for example, although larger sizes above 30 nm are also possible. This width dimension is oriented parallel to a direction of linear polarisation of the writing light beam used to create the nanostructures. Within the plane parallel to the input face, the width may take any orientation depending on the required optical axis for the birefringence.

In a direction orthogonal to the input face of the optical element, and hence parallel to the propagation direction of light propagating through the optical element, the nanostructures may have a length of 100 nm or less. In some examples, the length does not exceed 90 nm, or does not exceed 80 nm, or does not exceed 70 nm, or does not exceed 60 nm, or does not exceed 50 nm, or does not exceed 40 nm. A smaller length and width of nanostructure provides a lower optical loss owing to reduced Rayleigh scattering, whereas a longer length increases the available retardance imparted to a propagating light beam. Accordingly, the length of the structures provides the strength of the retardation. The length is substantially equal to the major axis of the elliptical cross section parallel to the input face, owing to the oblate spheroid shape of the nanostructures. The individual nanostructures may be considered as discrete retarders, although the retardance offered by a single nanostructure might be negligible, and the combined effect of all the nanostructures is significant. The overall length of the region or volume of modification within the optical element is relevant to the total retardance offered. The birefringence per se may be defined by a single unit of nanostructure, but the total retardance is found by integration along the modification length. This might be of the order of tens of micrometres, depending on the numerical aperture used to focus the writing beam.

The nanostructures are created in a layer at a depth behind the input face determined by the parameters of the writing beam, in particular the numerical aperture. An optical element may include more than one layer of nanostructures. The size and orientation of the individual nanostructures can be approximately constant throughout the volume of the material, and/or within a layer. Alternatively, the size and/or the orientation can vary across the height, width and/or length of the volume to provide a locally varying and tailored birefringent effect for the optical element. The birefringence can be formed across or through the element in any pattern. The size and orientation of the nanostructures can be manipulated as required by controlling parameters of the writing laser beam so that virtually any phase and/or polarisation and/or intensity profile can be imparted to an incident light beam.

The bulk material of the substrate used to form the optical element is a transparent material, meaning that it has a significant transmission for at least some wavelengths across the spectrum from ultraviolet to the near-infrared (roughly 200 nm to 2500 nm). It should have a high transparency at the wavelength used for the writing laser beam, and also for the intended light beams to be used with the finished optical element. Usefully, the material may be an amorphous glass material. For example, it may be silica (silicon dioxide, $SiO_2$), including fused silica. The silica or other glass material might be doped with other materials to modify its optical properties. Examples of doped or multicomponent glasses may include materials such as $Al_2O_3$, $B_2O_3$, alkaline earth oxides and $Na_2/K_2O$ but other elements and compounds may be used; the disclosure is not limited in this regard. Other materials for the optical element may be any material able to support the laser induced nanostructures, included materials in which nanogratings such as a type 11 modification have previously been demonstrated. These include multicomponent glasses, $GeO_2$ glass, porous glass, aerogel glass, silicon and silicon materials, semiconductor materials, lithium niobate and other lithium oxide compounds. Other materials are not excluded, however. In the case of doped silica or other materials, the parameters of the pulsed writing laser beam may require adjustment to take account of the physical properties of the material, in particular the bandgap and the thermal properties. The nanostructures are formed so as to be embedded within the volume of the material of the optical element. They can be formed in single layer, with a thickness of the layer being in a range of about 50 μm to about 500 μm. Control of the writing laser parameters can create a plurality of layers at different depths in the element (i.e. at different positions along the length of the propagation direction). As an example, the optical element may have a thickness on this direction of about 3 mm, although thicker and thinner dimensions can of course be used as convenient.

Figure 10:
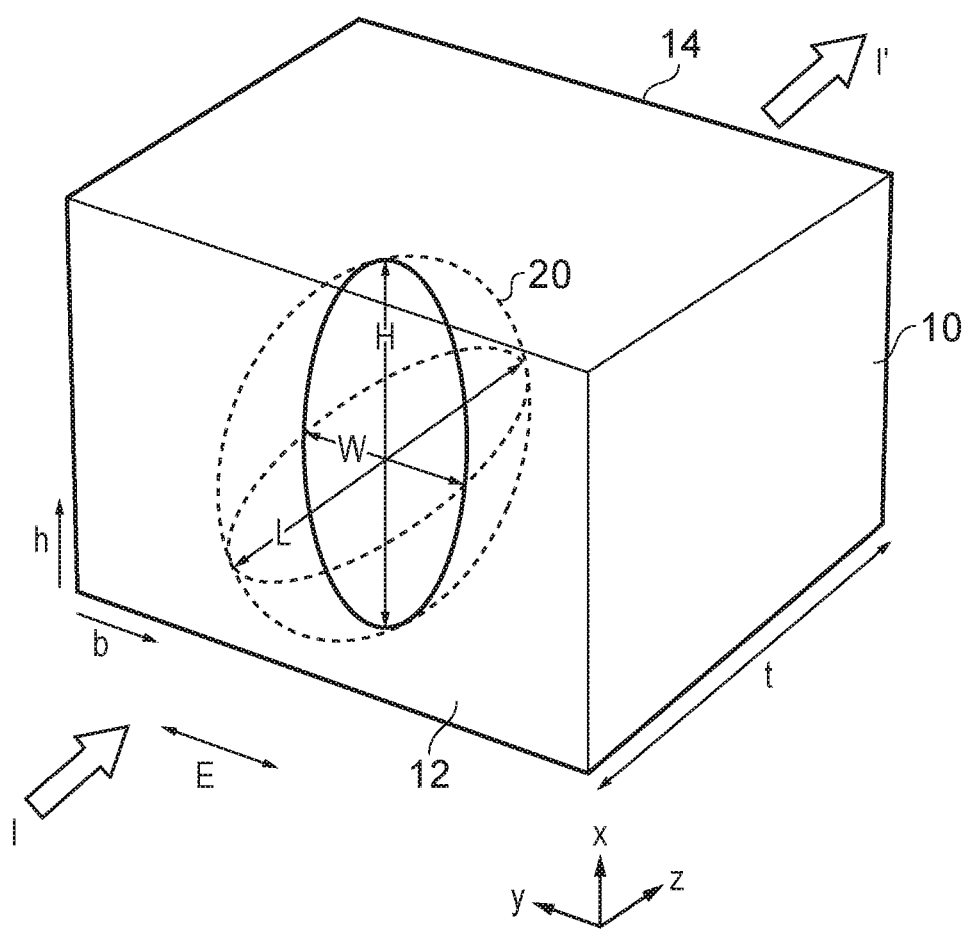
FIG. 10 shows a simplified schematic representation of an individual oblate spheroidal nanostructure within a substrate.

FIG. 10 shows a highly schematic and not to scale representation of an individual nanostructure 20 of a type X modification within an optical element 10. For clarity, just a single nanostructure is shown, but as described above, in reality the type X modification comprises many such nanostructures randomly arranged within the material of the optical element, as shown in FIG. 2B for example. The optical element 10 has an input face 12 for receiving incident light, which propagates through the optical element along a propagation direction z which is parallel to the thickness t of the optical element and leaves through an output face 14 opposite to the input face 12. For the initial writing, the incident light beam l has a linear polarisation E which in this example is aligned parallel to the y direction, or breadth of the sample forming the optical element 10. In use of the formed optical element, an incident or input light beam l is modified or transformed into output light beam l' by the birefringence of the optical element 10 created by the writing process. The nanostructure 20 has a length L substantially parallel to the thickness t of the optical element, within the numerical ranges described above (so, in a range not greater than 100 nm. The length L is perpendicular to the plane of the input face 12. The nanostructure 20 has a cross-sectional shape in a plane parallel to the input face which has an oval, elliptical or oblate shape, with a major axis or height H and a smaller minor axis or width W orthogonal to the height. The major axis is larger than the minor axis. The width W has a size within the numerical ranges described above (so, not larger than 30 nm, typically). Owing to the oblate spheroidal shape of the nanostructure 20, the length L and the height H are substantially equal, and the cross-section of the nanostructure 20 through the length L and height H is roughly circular. In some cases there may be some difference between the length L and height H, since the growth of the nanostructure along these two dimensions may evolve slightly differently. For example, the length L may become greater than the height H. Typically, though, L and H will be at least similar to each other when compared to the width W, which is less than both. The input face 12 has a height dimension h and an orthogonal breadth direction b. The width W and height H of the nanostructure 20 lie at some angle to the height h and the breadth b; this sets the orientation of the nanostructure which is defined as lying along the height direction (major axis). Either of H and W can be parallel to either of h or b, or can be arranged at any angle between the parallel alignment. This orientation (direction of the major axis H) establishes the birefringence offered by the optical element, or that local portion of the optical element if the orientation is locally varying. The length L of the nanostructure 20 defines the total retardance available from the birefringence.

Figure 11:
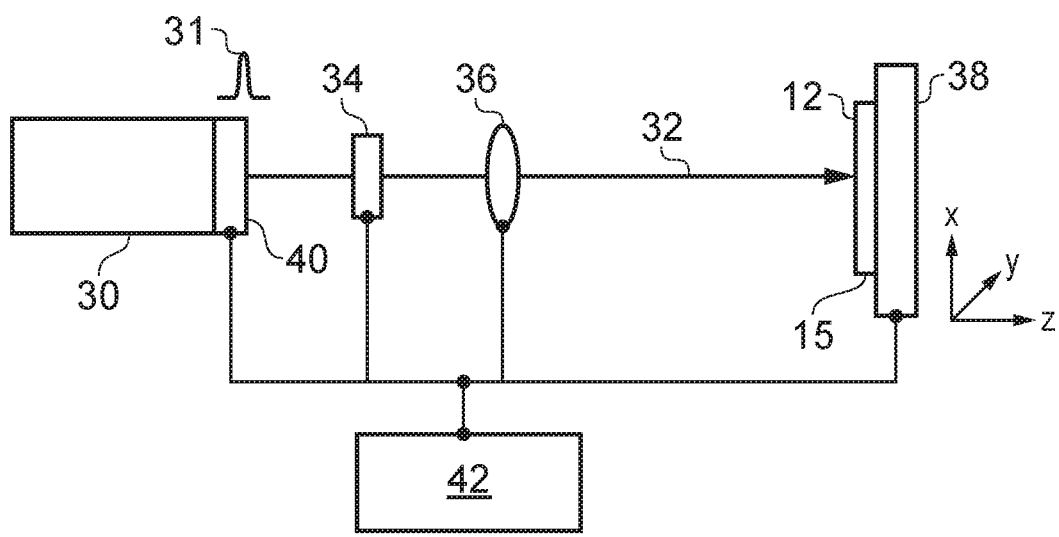
FIG. 11 shows a simplified schematic representation of apparatus for fabricating an optical element having a type X nanostructure.

FIG. 11 shows a schematic representation of an example apparatus suitable for creating an optical element with a type X modification as described herein. A sample or blank 15 of appropriate transparent material, such as silica, from which an optical element is to be fabricated, is mounted on a translation stage 38 or similar device for providing a scanning movement. The mounting is arranged so that the optical element can be moved in the x and y directions within a plane parallel to its front face 12 (which will become the input face of the optical element, or conversely, the output face).

A laser 30 operable to generate a stream of ultrashort pulses 31 with a pulse duration in the femtosecond domain is provided. The pulsed output beam 32 of the laser, comprising the writing beam for the fabrication process, should be linearly polarised for the writing process, so if necessary it can be passed through one or more polarising elements 34 to create the required polarisation. The beam 32 is also passed through a focusing arrangement 36 comprising one or more lenses or mirrors configured with a low numerical aperture. The beam 32 has a Gaussian profile (although this is not essential and other beam profiles may be used, such as a profile described by a Bessel function). Other optics may be included along the path of the beam, such as to direct it onto the sample 15 if required. Also, one or more controls or optical devices 40 may be included by which one or more parameters of the laser beam such as wavelength, pulse duration and pulse energy. This device 40 may or may not be integral with the laser 30.

The beam 32 is directed onto the face 12 of the sample 15, and is scanned over the surface following a beam scanning or writing path that covers an area of the surface behind which it is desired to form the nanostructure in the bulk of the sample material. The size of the scan area is chosen with regard to the intended use of the optical element. Examples include areas with a width or diameter up to about 10 cm for optical memory, areas of width about 1 to 2 mm up to about 1 to 2 cm for geometric phase optical elements, and much smaller areas with width on the micrometre scale such as about 5 to 20 μm for some micro-waveplates. Other sizes of scan area can be used as demanded by the relevant application. The scanning path can follow any convenient shape, such as a back-and-forth or serpentine path, or a spiral path which may proceed from the centre of the area outwards or from the edge of the area inwards, or a raster path in which the beam is interrupted while the sample is returned to the same edge position for the next raster line. Any other path shape may be used. According to this example, the scanning is achieved by moving the sample 15 within the x-y plane using the translation stage 38, which may be under the control of programmable or pre-programmed software executed on a computer processor 42, or by other automated control. In an alternative arrangement, the sample may remain fixed and the beam may be moved over the sample surface by movement of beam directing optics (not shown) or of the laser itself. Alternatively, movement of both the sample and the beam may be implemented. During the scanning, the sample 15 may be maintained at a constant separation from the focusing arrangement 36 (same position in the z-direction) so as to maintain the position of the beam's focus relative to the sample surface 12, i.e. the location of the focus within the thickness of the sample 15. If more than one layer of nanostructures is to be written or imprinted into the sample 15, scanning along the scan path can be repeated at other depths within the sample thickness by changing the position of the sample 15 relative to the focusing arrangement 36 along the z direction (beam propagation direction). Alternatively, the focusing depth might be altered during a scan to form nanostructures at varying depths.

The speed of the scanning (i.e. the speed of the relative movement of the beam 32 and the sample 15 along the path of the scan) may be selected with reference to the pulse repetition rate of the laser 30 so as to achieve a pulse density along the scan path of not more than 100 pulses/μm, or $10^5$ pulses/mm. Alternatively, the pulse density might be chosen to be 90 pulses/μm or less, or 80 pulses/μm or less, or 70 pulses/μm or less, or 60 pulses/μm or less, or 50 pulses/μm or less, or 40 pulses/μm or less, or 30 pulses/μm or less, or 20 pulses/μm or less, or 10 pulses/μm or less, or 5 pulses/μm or less, or 1 pulses/μm or less. Within the chosen pulse density regime, any scan speed and any pulse repetition rate can be used to deliver the required pulse density. As an example, the pulse repetition rate may be 200 kHz.

As discussed above, the pulse energy is selected in conjunction with the pulse density and numerical aperture to meet the energy threshold for achieving a type X modification while avoiding the formation of a type II modification. Values of pulse energy in the range of 0.8 to 1.5 μJ may be appropriate. Referring to FIG. 6, it can be seen that pulse energies in the larger range of 0.8 to 2 μJ might be used. However, it may be necessary to use alternative pulse energies depending on the wavelength of the writing beam and the numerical aperture, since these parameters affect the energy density and the interaction of the beam with the material. For example, the pulse energy might be in the range of 0.5 to 2 μJ, or 0.6 to 2 μJ, or 0.7 to 2 μJ, or 0.9 to 2 μJ, or 1 to 2 μJ, or 1.5 to 2 μJ, or 0.5 to 1.5 μJ, or 0.6 to 1.5 μJ, or 0.7 to 1.5 μJ, or 0.9 to 1.5 μJ, or 1 to 1.5 μJ. In some circumstances, the pulse energy may be at least 0.5 μJ, or at least 0.6 μJ, or at least 0.7 μJ, or at least 0.8 μJ, or at least at least 0.9 μJ or at least 1.0 μJ, or at least 1.1 μJ, or at least 1.2 μJ, or at least 1.3 μJ, or at least 1.4 μJ, or at least 1.5 μJ, and may be no greater than 0.8 μJ, or no greater than 0.9 μJ, or no greater than 1.0 μJ, or no greater than 1.1 μJ, or no greater than 1.2 μJ, or no greater than 1.3 μJ, or no greater than 1.4 μJ, or no greater than 1.5 μJ, or no greater than 1.6 μJ, or no greater than 1.7 μJ, or no greater than 1.8 μJ, or no greater than 1.9 μJ, or no greater than 2.0 μJ, or no greater than 2.2 μJ or no greater than 2.5 μJ. Considering pulse energy in relation to numerical aperture (suitable values for which are described in more detail below), larger pulse energies may be selected in combination with lower numerical apertures. For relatively large numerical apertures, the pulse energy can be reduced, and might for example be taken as low as 0.05 µJ. Hence, the pulse energy might be in the range of 0.05 µJ to 0.5 µJ. Other ranges that may be useful include 0.1 µJ to 0.5 µJ, 0.2 µJ to 0.5 µJ, 0.3 µJ to 0.5 µJ, 0.4 µJ to 0.5 µJ, 0.05 µJ to 0.6 µJ, 0.05 µJ to 0.7 µJ, 0.05 µJ to 0.8 µJ, 0.05 µJ to 0.9 µJ, 0.05 µJ to 1.0 µJ, 0.05 µJ to 1.5 µJ and 0.05 µJ to 2.0 µJ, for example.

The pulse energies noted above have been found to be useful in conjunction with pulse durations in the range of 500 to 900 fs, although other pulse energies may be used with this pulse duration range if appropriate. With appropriate selection of numerical aperture of the focusing arrangement, other pulse durations might be relevant. For example, the pulse duration may be in the range of 300 to 900 fs In other cases, the pulse duration may be in the range of 300 to 400 fs, 300 to 500 fs, 300 to 600 fs, 300 to 700 fs, 300 to 800 fs, 400 to 500 fs, 400 to 600 fs, 400 to 700 fs, 400 to 800 fs, 400 to 900 fs, 500 to 600 fs, 500 to 700 fs, 500 to 800 fs, 500 to 900 fs, 600 to 700 fs, 600 to 800 fs, 600 to 900 fs, 700 to 800 fs, 700 to 900 fs, or 800 to 900 fs. Pulses shorter than 300 fs or longer than 900 fs may be suitable in particular circumstances. For example the pulse duration may be as short as 100 fs or 200 fs, or as long as 1000 fs, so that the duration is chosen to be in a range with a lower limit of 100 fs or 200 fs, and an upper limit of 300 fs, or 400 fs, or 500 fs, or 600 fs, or 700 fs, or 800 fs, or 900 fs, or 1000 fs.

The wavelength of the laser beam may be at or around 1030 nm, such as within the range of 1000 nm to 1060 nm. Other wavelengths may also be used, including shorter wavelengths such as at or around 515 nm and at or around 343 nm. Hence, the wavelength might be chosen in the range of 340 nm to 1100 nm. Other smaller ranges may be appropriate depending on the other operating parameters, such as in the range of 300 nm to 1000 nm, 400 nm to 1000 nm, 500 nm to 1000 nm, 600 nm to 1000 nm, 700 nm to 1000 nm, 800 nm to 1000 nm, 900 nm to 1000 nm, 300 nm to 900 nm, 400 nm to 900 nm, 500 nm to 900 nm, 600 nm to 900 nm, 700 nm to 900 nm, 800 nm to 900 nm, 300 nm to 800 nm, 400 nm to 800 nm, 500 nm to 800 nm, 600 nm to 800 nm, 700 nm to 800 nm, 300 nm to 700 nm, 400 nm to 700 nm, 500 nm to 700 nm, 600 nm to 700 nm, 300 nm to 600 nm, 400 nm to 600 nm, 500 nm to 600 nm, 300 nm to 500 nm, 400 nm to 500 nm or 300 nm to 400 nm, or any of 300 nm, 400 nm, 500 nm, 600 nm, 700 nm, 800 nm, 900 nm or 1000 nm to 1060 nm or 1100 nm or 1200 nm. Alternatively, the ranges may extend down to 200 nm in some examples. Longer wavelengths may also be used, so that the upper end of the above-listed ranges might instead be 1300 nm, or 1400 nm, or 1500 nm, or 1600 nm, or 1700 nm, or 1800 nm, or 1900 nm, or 2000 nm, or 2100 nm, or 2200 nm, or 2300 nm, or 2400 nm, or 2500 nm. Overall, therefore, the wavelength might lie in the range of 200 nm to 2500 nm. Any suitable laser source can be used to generate the writing beam, but a Ti:sapphire laser, operating to generate a femtosecond output tuneable within the wavelength range of 650 nm to 1100 nm may be used. Also, higher harmonics of this near-infrared range could be used. Another example laser is an ytterbium-doped potassium gadolinium tungstate regenerative amplified laser, mod-elocked to provide pulses in the femtosecond domain. Other lasers and optical sources operable in the visible and/or near-infrared spectral range could also be used.

The numerical aperture of the focusing arrangement, noted above as being low, may for example be about 0.16, or a value near to 0.16, such as between 0.14 and 0.18, or between 0.12 and 0.20, or between 0.10 and 0.22, or may be within a larger range such as 0.16 to 0.4. Lower numerical apertures might also be used, including as low as about 0.05. Therefore, in some example the numerical aperture might be between 0.05 and 0.4, or 0.05 and 0.3, or 0.05 and 0.2, or 0.05 and 0.15, or 0.05 and 0.1, or 0.05 and 0.09, or 0.05 and 0.08, or 0.05 and 0.07, or 0.05 and 0.06.

Hence, a variety of ranges for all the various laser parameters might be chosen. As will be appreciated, multiple parameters can be adjusted to achieve a selected level of energy delivery to the substrate material, and the skilled person would expect to be able explore the parameters across wide ranges to produce the selected level. This increases the flexibility of the described method; it is not constrained to a small selection of operating parameters, and successful results may be achieved within large ranges, so parameters can be chosen with regard to convenience and available apparatus, for example.

As described above, the writing beam may be configured to provide a particular size and orientation of nanostructure within the sample material, to achieve a desired birefringence property (size and optical axis orientation). The beam properties may be kept constant throughout the writing process to provide a uniform birefringence. This will be suitable for a simple optical element such as a half-wave plate or a quarter-wave plate. More complex optical elements can be written by altering the beam during the writing process, so that different parts of the writing path receive pulses of different characteristics, so as to alter the size and orientation of the nanostructures on a local basis. For example, the orientation of the nanostructures determines the birefringence axis orientation, and the orientation of the nanostructures depends on the polarisation of the writing beam. Accordingly, the polarisation of the beam may be adjusting during a writing process, by altering the polarising element 34. For example, the polarising element 34 may be under computer control via the processor 42, together with the translation stage 38, to provide the required polarisation of the laser beam for each part of the scan path. Similarly, the processor 42 may also control the control device 40 to modify one or more of the pulse energy, pulse duration or wavelength during a scan and/or between scans, and may control the focusing arrangement 36 to adjust the numerical aperture during a scan and/or between scans The nanostructure properties may be altered by changing the beam over the scanning process to create complex optical elements for light beam modification, such as the examples in FIG. 8. Alternatively, the beam may be modulated in polarisation, pulse energy, pulse density, pulse duration, and other characteristics as noted above during the course of the scan so as locally modify the nanostructures and thereby write data into the sample if the optical element is intended as optical memory, as discussed in more detail below.

A significant application of ultrafast laser-induced nano-structured geometric phase elements is for optical memory formed in glass, such as 3D optical memory in which the spatial positions or coordinates of nanostructures are used to encode data, or in higher dimensional devices in which polarisation and/or other properties are also used to encode data. These various formats may be collectively referred to as multi-dimensional optical memory or optical data storage, including three dimensions and above. For example, the polarisation of the writing light beam may be varied to alter the orientation of the nanostructures, as a fourth parameter for 4D optical memory. For five dimensions, the two independent parameters that describe the self-assembled form birefringence provided by the nanostructure, namely the slow axis orientation (fourth dimension, from the polarisation of the writing beam) and the strength of retardance (fifth dimension, from the energy of the writing beam), are combined with the three spatial dimensions for the optical encoding of information in 5D. The slow axis orientation and the retardance can be independently controlled or manipulated by the polarisation and intensity of an ultrashort pulsed laser beam used to induce, or write the nanostructure. The optically encoded data can be retrieved from quantitative birefringence measurements of light transmitted through the nanostructure. As noted above, other laser parameters can be altered to modify the characteristics of an imprinted nanostructure, so these can be used as additional degrees of freedom to increase the optical coding to higher dimensions. Optical memory of this kind has the potential for hundreds of terabytes of data storage capacity per optical element, and thermal stability up to 1000° C., so is very attractive, and exceeds conventional high density data storage solutions in terms of durability. In comparison, magnetic tape, flash drive and hard disk drive technologies providing terabytes per device capacity will wear out in less than thirty years, and conventional optical data storage offering lifetimes of around one thousand years has a maximum capacity of 100 GB per disc. Optical elements according to the present disclosure offer further improvements for implementing multi-dimensional optical data storage. For previous nanogratings (type II, for example), the optical scattering loss limits the maximum number of nanostructure layers it is possible to read from an optical memory element. The reduced loss and reduced stress offered by the random anisotropic nanostructures of a type X device enables the reading of more than a hundred layers, thereby increasing storage capacity and read-out efficiency.

Figure 12:
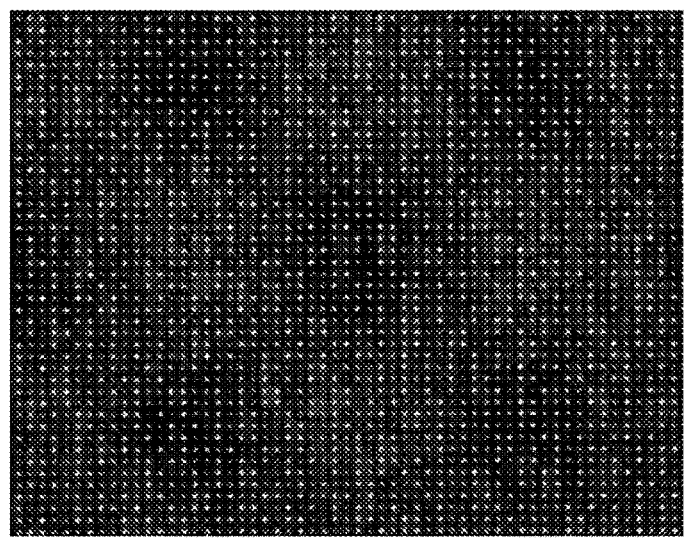
FIG. 12 shows an image of multi-dimensional optical data storage recorded using a type X nanostructural modification in silica.

FIG. 12 shows an image of multi-dimensional optical data storage that has been recorded in silica using a type X modification written according to the present disclosure. The low scattering losses of by a type X element are apparent, and indicate that more than a hundred layers of data can be achieved both for recording and readout.

Other applications include the fabrication of space-variant retarders, polarisation converters, and flat or geometrical phase optics. Complex wave plate patterns and any phase profile optics with high density elements (sub-wavelength pixel size) can be manufactured for operation across a large spectral transmission window including ultraviolet and near-infrared wavelengths. Also, the high transmission and durability of silica elements enable applications requiring the polarisation/phase/intensity shaping of high-power laser beams.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in the future.

REFERENCES

[1] P G Kazansky, H Inouye, T Mitsuyu, K Miura, J Qiu, K Hirao and F Starrost, Phys. Rev. Lett. vol. 82, 2199-2102 (1999)
[2] N Yu and F Capasso, Nat. Materials vol. 13, 139 (2014)
[3] WO 2015/150566
[4] Y Shimotsuma, P Kazansky, J Qui and K Hirao, Phys Rev. Lett. vol. 91, 247405 (2003)
[5] M Beresna, M Gecevicius, M Lancry, B Poumellec and P G Kazansky, Appl. Phys. Lett. vol. 103, 131903 (2013)
[6] C Hnatovskya, R S Taylor, P P Rajeev, E Simova, V R Bhardwaj, D M Rayner and P B Corkum, Appl. Phys. Lett. vol. 87, 014104 (2005)
[7] R Drevinskas and P G Kazansky, APL Photonics vol. 2, 066104 (2017)]
[8] A Rudenko, J-P Colombier, S Höhm, A Rosenfeld, J Kruger, J Bonse and T E Itina, Scientific Reports vol. 7 12306 (2017)
[9] A Rudenko, H Ma, V P Veiko, J-P Colombier and T E Itina, Appl. Phys. A vol. 124, 63 (2018)

The invention claimed is:

1. An optical element for modifying an incident laser beam propagated through the optical element from an input face to an output face via a geometric phase birefringent effect, the optical element comprising:
   a substrate of a transparent material with an input face and an opposite output face; and
   a structural modification in a volume of the substrate between the input face and output face comprising a plurality of non-periodically positioned nanostructures;
   wherein each nanostructure has a oblate spheroidal shape with an elliptical cross section in a plane parallel to the input face, the elliptical cross-section having a minor axis substantially not larger than 30 nm and a major axis greater than the minor axis, and each nanostructure having a length in a direction perpendicular to the input face which is substantially not larger than 100 nm.

2. The optical element according to claim 1, in which the transparent material comprises a glass material.

3. The optical element according to claim 1, in which the nanostructures are non-periodically positioned within one or more layers substantially parallel to the input face.

4. The optical element according to claim 1, in which the major axis of each nanostructure has a same orientation relative to the substrate.

5. The optical element according to claim 1, in which orientations of the major axes of the nanostructures are varied relative to the substrate.

6. The optical element according to claim 1, in which the nanostructures have substantially the same width and the same length.

7. The optical element according to claim 1, in which the nanostructures have differing widths and/or lengths.

8. A method of modifying one or more of a phase, polarisation or intensity of a light beam comprising passing the light beam through an optical element according to claim 1 from the input face to the output face.

9. A method of fabricating a nanostructured optical element, comprising:
- providing a substrate of a transparent material within which nanostructures are required and having a face intended for the input or output of light to be modified by the optical element;
- directing a focused beam of linearly polarised femtosecond pulses of laser light onto the substrate face to position the focus within the substrate; and
- causing relative movement between the beam and the substrate to scan the beam along a path over an area of the face where the nanostructures are required;
- wherein the beam is scanned to deliver pulses at a pulse density of not more than 100 pulses per micometre along the path;
- the pulses have a duration in the range of 100 to 1000 femtoseconds; and
- the beam is focused with a focusing arrangement having a numerical aperture in the range of 0.05 to 0.40.

10. The method according to claim 9, wherein the laser light has a wavelength in the range of 200 nm to 2500 nm.

11. The method according to claim 9, wherein the transparent material is a glass material.

12. The method according to claim 11, wherein the glass material comprises silica glass or doped silica glass.

13. The method according to claim 9, wherein the pulses have a pulse energy in the range of 0.5 to 2.5 µJ.

14. The method according to claim 9, wherein the pulses have a pulse energy in the range of 0.05 to 0.5 µJ.

15. The method according to claim 9, further comprising varying a direction of the linear polarisation during the scan to create nanostructures with differing orientations.

16. The method according to claim 9, further comprising varying one or more of the pulse density, the pulse duration, the numerical aperture, an energy of the pulses and a wavelength of the laser light during the scan, to create nanostructures with differing sizes.

17. The method according to claim 9, comprising performing one or more additional scans for different depths of the focus within the substrate, to create nanostructures arranged in two or more layers.

18. The nanostructured optical element fabricated using the method according to claim 9.

19. A multidimensional optical data storage element comprising:
- a substrate of a transparent material with an input face and an opposite output face; and
- a structural modification in a volume of the substrate between the input face and output face comprising a plurality of non-periodically positioned nanostructures in one or more layers;
- wherein each nanostructure has a oblate spheroidal shape with an elliptical cross section in a plane parallel to the input face, the elliptical cross-section having a minor axis substantially not larger than 30 nm and a major axis greater than the minor axis, and each nanostructure having a length in a direction perpendicular to the input face which is substantially not larger than 100 nm; and each nanostructure has one or more of a position within the substrate, an orientation of the major axis, and a length that are selected to encode data that can be read by transmitting one or more beams of light through the substrate from the input face to the output face and deducing birefringence of the substrate from the transmitted light.

20. A method of storing data in a multi-dimensional optical memory comprising:
- providing a substrate of a transparent amorphous material having an input face;
- directing a focused beam of linearly polarised femtosecond pulses of laser light onto the input face to position the focus within the substrate; and
- causing relative movement between the beam and the substrate to scan the beam along a path over an area of the face;
- wherein the beam is scanned to deliver pulses at a pulse density of not more than 100 pulses per micometre along the path;
- the pulses have a duration in the range of 100 to 1000 femtoseconds; and
- the beam is focused with a focusing arrangement having a numerical aperture in the range of 0.05 to 0.40;
- so as to create non-periodically positioned nanostructures in one or more layers within the substrate;
- wherein one or more of a polarised direction of the laser light, the pulse density, the numerical aperture, the pulse duration, a pulse energy and a wavelength of the laser light are varied during the scan to create nanostructures of varying size and/or orientation at different position within the substrate, the size and/or orientation and/or position within the substrate being selected to encode the data to be stored.

21. A multi-dimensional optical memory comprising encoded data stored using a method according to claim 20.

* * * * *